United States Patent [19]

Plotzke

[11] 3,831,955

[45] Aug. 27, 1974

[54] CHUCKING DEVICE

[75] Inventor: Thomas J. Plotzke, Richmond, Mich.

[73] Assignee: Johnson Die & Engineering Co., Detroit, Mich.

[22] Filed: Nov. 22, 1972

[21] Appl. No.: 308,706

[52] U.S. Cl............ 279/2 A, 269/48.1, 269/54.3, 269/61, 269/288, 279/2, 279/4, 279/74
[51] Int. Cl............................................ B23b 31/40
[58] Field of Search........ 269/47, 48, 48.1, 52–54.5, 269/104, 254 R, 287, 288, 61; 279/2, 123, 74, 57, 1 F, 82, 2 A, 4

[56] References Cited
UNITED STATES PATENTS

| | | | |
|---|---|---|---|
| 1,356,574 | 10/1920 | Warder | 279/2 |
| 2,377,991 | 6/1945 | Carlson | 279/2 X |
| 2,395,534 | 2/1946 | Cook | 279/82 |
| 2,409,680 | 10/1946 | Heeter | 279/2 |
| 2,686,681 | 8/1954 | Nylanb | 279/2 |
| 2,742,296 | 4/1956 | Satterlee et al | 279/2 |
| 3,022,066 | 2/1962 | Benes | 269/61 |

FOREIGN PATENTS OR APPLICATIONS

580,001   10/1924   France................................ 279/74

Primary Examiner—Granville Y. Custer, Jr.
Assistant Examiner—Craig R. Feinberg

[57] ABSTRACT

A pin-type chucking device particularly adapted for use with sheet metal parts, to grip and rotatably drive such parts about an axis is disclosed. The invention is embodied in both external and internal pin chuck constructions.

37 Claims, 12 Drawing Figures

CHUCKING DEVICE

The invention involves and pertains to a chucking device having a plurality of radially disposed spring-biased pins having their distal points directed outwardly, or in a second form of the invention, directed inwardly. The heads of the work piece engaging pins are driven, in one form of the device, by an axial core head that bears upon the proximal ends of the pins to force them radially outwardly for engagement with the part to be rotatably driven. In a second embodiment of the invention, an annular pin driving ring is moved axially in bearing contact upon the pin heads to move them inwardly for engagement with the work piece to be rotatably driven. The chuck pins are provided with distal pointed ends that penetrate partially into the work piece, thereby engaging it for rotative or axial movement. By utilizing a substantial plurality of such pins, the work piece is positively engaged with minimum distortion, depending upon the thickness and configuration of the sheet metal body.

It is an object of the invention to provide a chucking device particularly adapted for rotatably driving sheet metal work pieces. Another object is to provide radially disposed pin means in the chucking device for engagement of such sheet metal work pieces. A further object is to provide a pin type chucking device in which a plurality of radially disposed pins substantially simultaneously engage a sheet metal work piece. Still another object is to provide a pin type chucking device in which penetration of the sheet metal work piece by the chuck pins effects engagement with minimum distortion of the work piece. Yet another object is to provide a pin type chucking device for rotative or axial movement of the work piece, in machine operations performed thereon.

Various further and more specific objects, features and advantages of the invention will appear from the description given below, taken in connection with the accompanying drawings, illustrating by way of example preferred forms of the invention. Reference is here made to the drawings annexed hereto and forming an integral part of this specification, in which A sheet metal torus shell blank is described as a representative example of a sheet metal part on which a pin-type chucking device embodying the invention hereindisclosed has been and can be used.

FIGS. 1, 2 and 3 illustrate prior art constructions of such a sheet metal torus shell, in which

A. THE SHEET METAL WORK PIECE

Figure 1:
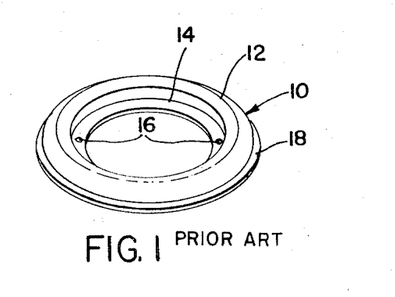
FIG. 1 is a perspective view illustrating the torus shell blank before it is slotted.
Figure 2:
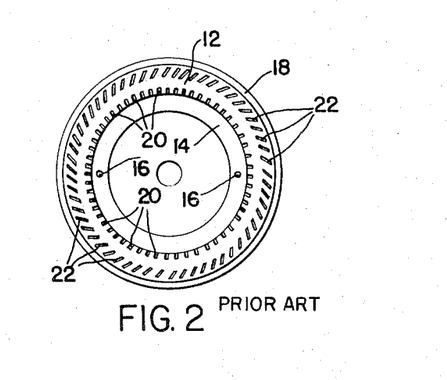
FIG. 2 is a plan view of a slotted blank made from the blank shown in FIG. 1.
Figure 3:
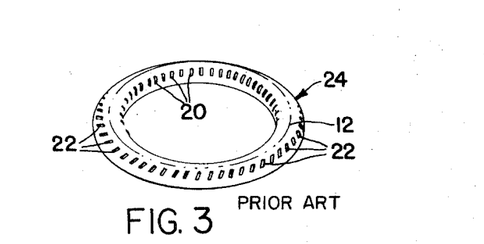
FIG. 3 is a perspective view of the finished torus shell with the interior and exterior flanges of the blank of FIG. 1 trimmed and removed therefrom.

As illustrated in FIGS. 1, 2 and 3, the prior art sheet metal torus shell blank 10 was formed with a convex-concave body 12 provided with an interior inwardly directed flange portion 14 having a pair of spaced apart openings 16,16 functioning as locating holes for die pins that are inserted thereinto for rotatably driving the shell blank 10, and with an external flange 18. The flanges 16 and 18 were formed primarily for engagement by a die set so that the shell blank could be rotatably driven into positions at which slotting punches perform their function of forming the inner and outer rings of slots 20 and 22 respectively. Following the slotting operation, the shell blank 10 was then placed in another die set where the flanges 14 and 18 were trimmed and removed to produce the finished slotted torus shell 24 substantially as illustrated in FIG. 3.

It will be readily apparent to persons skilled in the art to which the invention pertains that the presence of the inner and outer flanges 14 and 18 respectively requires the additional trimming operation, an important cost factor in the production of the finished shell. The principal need for such flanges is to provide positive means for rotatably driving and holding the sheet metal shell in the slotting operation.

Figure 4:
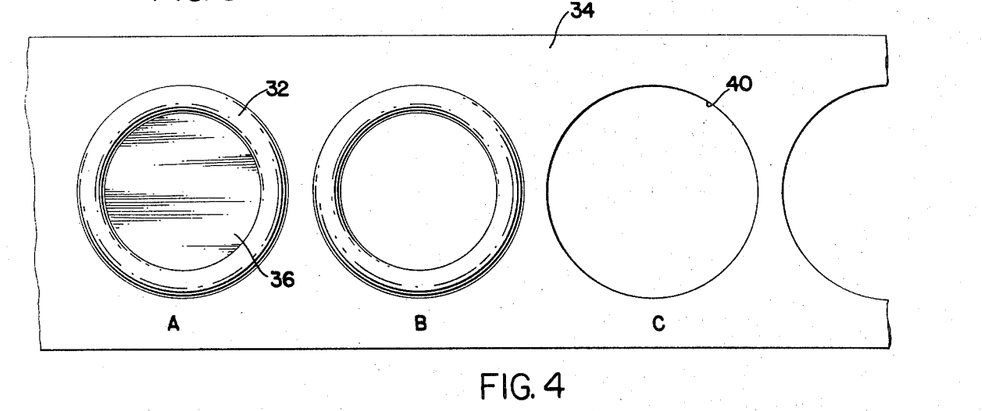
FIG. 4 is a top plan view showing a strip of metal progressively formed, from left to right, to produce the torus shell blank illustrated in perspective view in FIG. 5. This blank is free of the interior and exterior flanges illustrated in the prior art form of the shell blank shown in FIG. 1.

By virtue of the invention hereindisclosed, the necessity for the additional flange material and the trimming operation has been eliminated, simplifying its construction and production and reducing the cost of the finished sheet metal torus shell. As illustrated particularly in FIG. 4, the torus shell convex-concave annular body 32 is first formed in a stamping operation from a coil strip of sheet metal stock 34, with its central core 36 intact, at station A. The central core 36 is removed at station B by a blanking operation, and the torus shell blank 38 is then removed by another blanking operation at station C, leaving the opening 40 in the strip 34.

Figure 5:
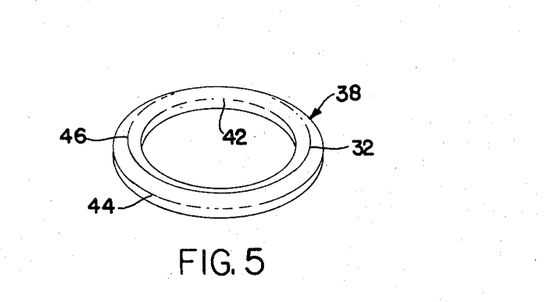

The integrally formed torus shell blank 38 is provided with an inner wall 42, an outer wall 44, and the intermediate convex-concave curved crown 46 (FIG. 5).

The torus shell blank 38, it will be noted, is free of any inner or outer flanges by which the prior art blank had been rotatably driven for the slotting operation to convert it into a finished torus shell ready for assembly. To rotatably drive the new blank 38 in a slotting machine, a pin-type chucking device embodying the invention described hereinafter below is provided.

B. INTERNAL PIN-TYPE CHUCKING DEVICE

As illustrated particularly in FIGS. 6, 7, 8 and 9, the internal pin-type chucking device 50 comprises the chuck head 52 and the pin driving core head 54. The chuck head 52 is fixedly secured to a driving member 56 for rotating the chuck head, and the pin driving core head 54 is fixedly secured to a post 58 for axial reciprocating movement relative to the chuck head 52 in the form illustrated in FIGS. 6, 7 and 8, and the core head 54 is operatively actuated from above (FIG. 9) by the pad 250 as will be described more fully below.

Figure 6:
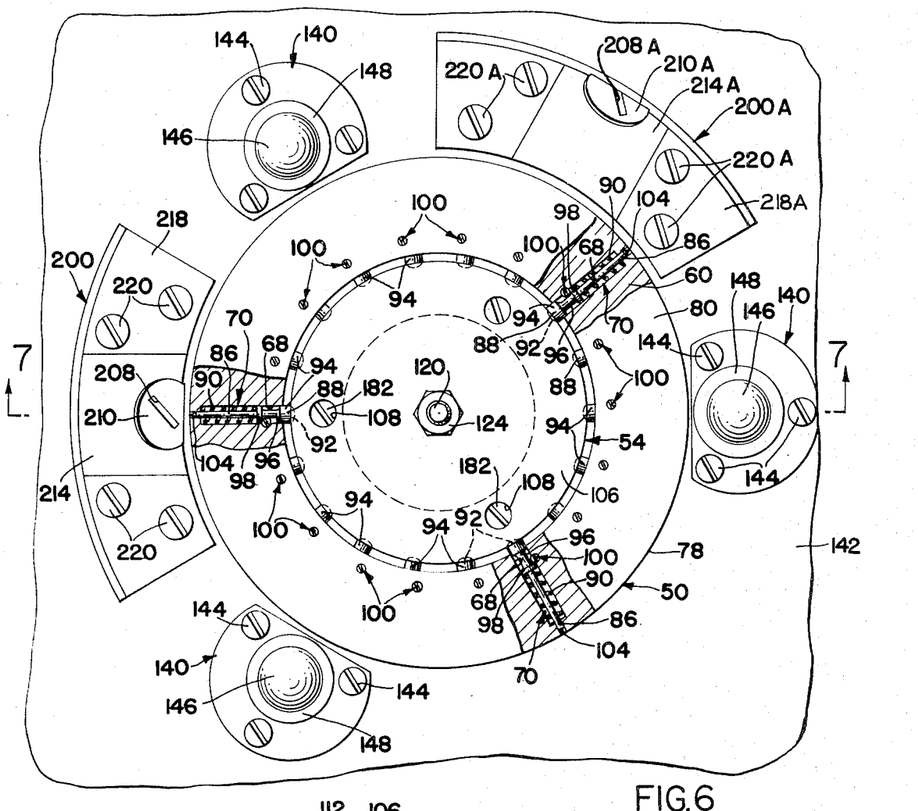
FIG. 6 is a top plan view of an internal pin-type chucking device embodying the invention for use with a sheet metal work piece substantially as illustrated in FIG. 5.
Figure 7:
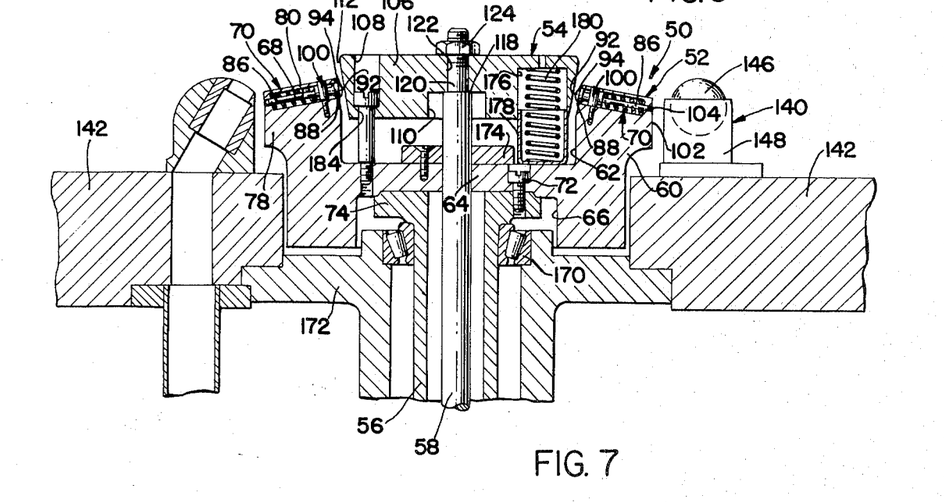
FIG. 7 is a vertical sectional view taken substantially on the line 7—7 of FIG. 6.
Figure 8:
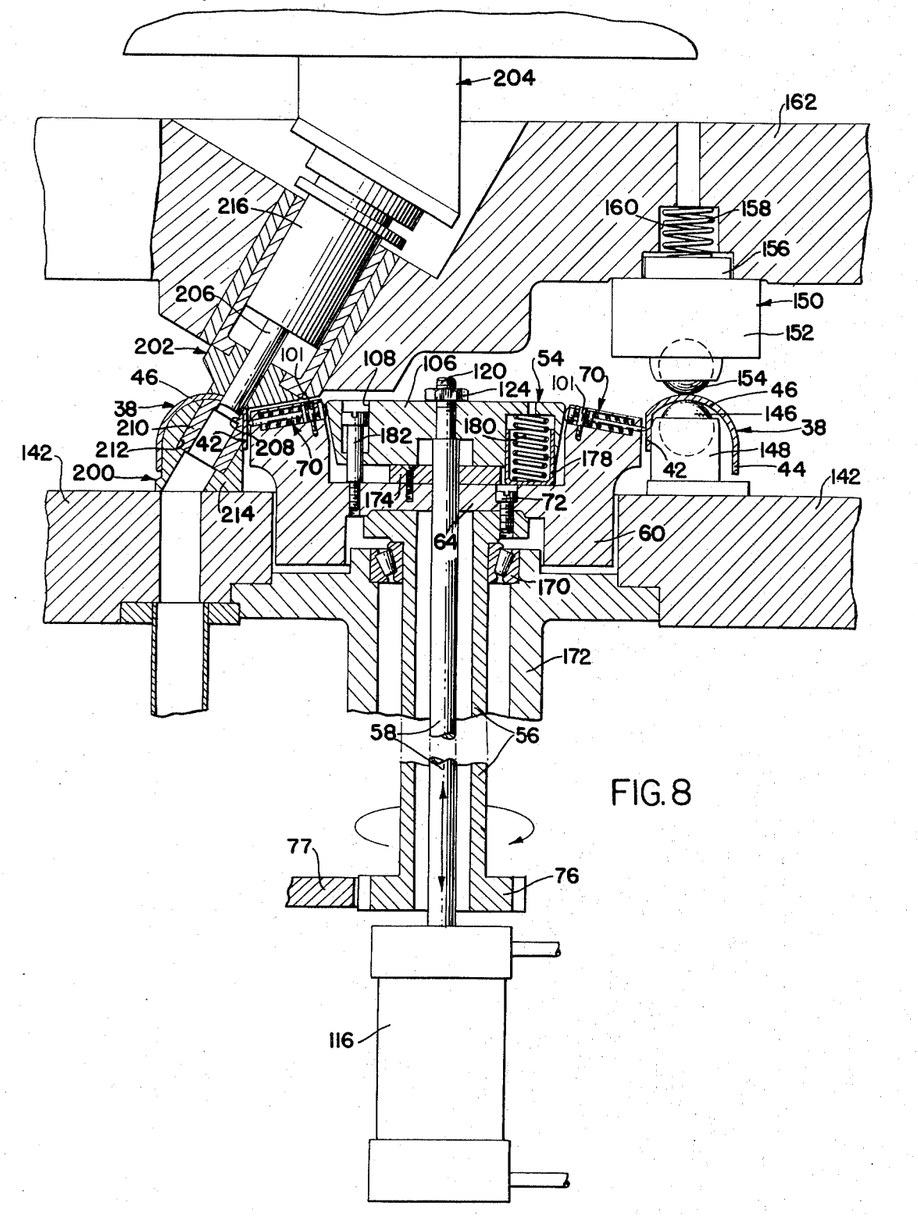
FIG. 8 is a vertical sectional view of the pin-type chucking device of FIGS. 6 and 7 rotatively driving the sheet metal work piece for a slotting operation.

As illustrated particularly in FIGS. 6, 7 and 8, the chuck head 52 comprises a body 60 having an axial counterbore 62 at its upper end, an intermediate web section 64, and an axial counterbore 66 at its lower side. A substantial plurality of radially disposed pin bores 68 for the chuck pins 70 are provided in the body 60 adjacent its upper side. The chuck head 52 is secured by screws 72 to a flange 74 at one end of the rotatable driving member 56 whose other end is provided with a driven gear section 76 engaged by suitable gear driving means 77 (shown only partially) adapted to engage and rotatably drive the member 56.

As illustrated particularly in FIGS. 6 and 7, the chuck head 52 is provided with its plurality of radially disposed pin bores 68 in the upper portion 78 above the web section 64 and relatively closely adjacent the distal surface 80 of the chuck head. Although the bores 68 are shown inclined slightly downwardly at an angle to the horizontal, they may be disposed in a horizontal or other suitable attitude, depending upon the particular application or use to which the chuck head is put. The pin bores are spaced radially apart from each other in substantially equal increments.

The pin structure 70 comprises a pin having a shank 86, a head 88, and a biasing return spring 90. The pin head 88 is provided at its proximal end with a convexly curved crown 92 terminating in a shoulder or flange 94, a body portion 96 of reduced diameter and a forward detent flange 98. A detent pin 100 is threadedly secured in the chuck head upper portion 78 with its projecting body 101 disposed adjacent the body portion 96 and intermediate the pin head flanges 94 and 98. The spring 90 is disposed in the pin bore 68 about the pin shank 86 and forward of the detent flange 98 to bias the pin rearwardly away from the peripheral edge or surface 102 defining the outer perimeter of the chuck head upper portion 78. The distal end of the pin shank 86 terminates in a conical pointed end 104 adapted to project from the pin bore 68 beyond the peripheral surface 102 upon radial movement outwardly of the pin 70.

The pin driving core head 54 comprises a body portion 106, a plurality of screw-receiving counterbores 108 at one side, an axial counterbore 110 on the other side of the body 106, and a downwardly inwardly tapering peripheral outer wall surface 112, whereby the core head 54 is generally in the form of a conical frustum. The reciprocatingly movable axial post 58, secured at its proximal end to the drive means 116, which may be a hydraulic or pneumatically operated device for reciprocatingly moving the post 58, is provided with a shoulder 118 at its distal end adjacent the seat of the counterbore 110, and with a distal threaded pin end portion 120 disposed through the core head bore 122 and extending outwardly therefrom for securement of a fastening nut 124 thereto, whereby the driving core head body 106 is fixedly mounted on the distal end of the post 58.

The distal end of the tubular driving member 56 is rotatably mounted in the bearing 170 seated in the supporting member 172 secured to the die set plate 142, under the flange 74 to which the chuck head web 64 is secured by the screws 72.

A stop disc or plate member 174 is seated upon the chuck head web 64 under the core head body 106 as a spacer stop to limit the axial pin-actuating travel of the body 106.

In addition to the counterbores 108 and 110, the core head body 106 is further provided with an offset counterbore 176 in which a plurality of spring retaining cups 178 are slidingly disposed with a slip fit, to enclose and encompass the biasing return spring 180 acting against the core head body 106. The closed end of the spring cup 178, under the biasing force of the spring 180, rests upon the chuck head web section 64 at all times, the other end of the spring 180 bearing upon the core head body 106. A plurality of guide travel-limiting screws 182 are threadedly secured to the chuck head web section 64, the shank of the screws extending through guide bores 184 in the core head body 106 below the counterbores 108 in which the heads of the screws 182 travel.

C. SLOTTING DIE SET

A die set in which the chucking device 50 is used includes a plurality of spaced apart ball supports 140 secured to the die plate 142 by screws 144, the balls 146 rotatable in and projecting upwardly from their support bodies 148, the crowns of the balls lying substantially in a plane. As illustrated particularly in FIG. 8, the concave surface of the shell blank crown portion 46 rests directly upon the balls 146. A complementary ball-type blank hold-down device 150 comprises a ball support body 152, the rotatable hold-down ball 154, and a hub section 156 and pressure cushioning spring 158 seated in the counterbore 160 of the hold-down plate 162. The hold-down devices 150 are disposed in vertical alignment and in register with the support ball mounts 140, to bear upon the shell blank 38 while it is being rotated upon the support balls 146 during the slotting operation.

Once the shell blank 38 has been placed upon the support balls 146, and the hold-down device 150 brought into contact upon the blank, the hydraulic or pneumatic actuator or cylinder 116, or other suitable means, operates to draw the post 58 and its attached core head 54 downwardly so that its frusto-conical peripheral surface 112 engages the pin head crowns 92 to drive the pin points 104 radially forward into the inner wall 42 of the torus blank 38 (FIG. 8). The pin points 104 partially penetrate the wall to effect positive engagement with the blank. The pin head flange 94 limits the radial forward movement of the pin shank 86 when it engages the screw body 101 fixedly mounted between the pin flanges 94 and 98 adjacent the pin body portion 96. Thus, the pin points 104 move outwardly only to the extent permitted by the screws 100 and the pin head flanges 94. Similarly, upon retraction of the core head 54 to its initial elevated position out of contact with the pin crowns 92, the pin flanges 98 engage the screw bodies 101 under the biasing influence of the return springs 90 as the pin points 104 retract from their engaging relationship with the shell blank inner wall 42.

Although the torus shell slotting mechanism forms no part of the invention herein disclosed and claimed, a limited description of that mechanism and its relationship to the sheet metal part that is rotated by the pin chuck constructions, whether internal or external in design, is considered helpful in understanding the merits of the invention. In very brief and limited form, the slotting mechanism comprises an anvil portion 200, and a punch mechanism 202 operatively actuated by a drive mechanism 204 mounted in the upper hold-down plate 162 to drive a punch 206 through the crown 46 of the torus shell blank 38 into the slotted die opening 208 of the anvil bushing 210 on the near inner side of the crown 46, as illustrated particularly in FIGS. 6–10 and 12. The slotted bushing 210 rests in a counterbore 212 in the body 214 of the anvil assembly 200. The punch 206 extends axially from the punch holder 216, which is reciprocatingly actuated by the drive mechanism 204. The anvil base 218 is secured to the die plate 142 by screws or other suitable fasteners 220.

The slotting mechanism for punching the slots in the near outer side of the crown 46 of the blank 38 is substantially the same in construction and the anvil 200a with its corresponding components is substantially illustrated in plan in the FIG. 6 view. Corresponding components in the anvil 200a are identified by the additional reference "a" after the reference numerals used in the description of the anvil and punch mechanisms 200 and 202 respectively.

D. MODIFIED INTERNAL PIN-TYPE CHUCKING DEVICE

Figure 9:
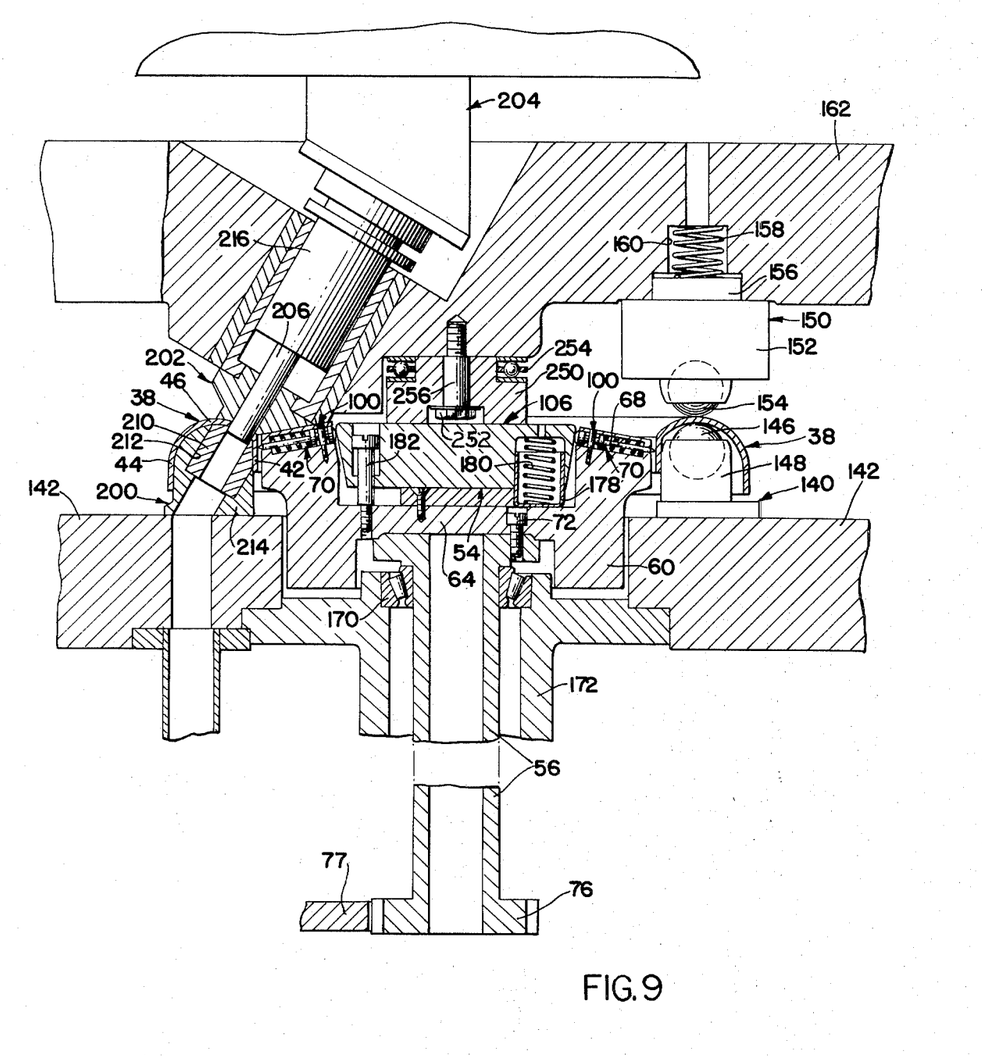
FIG. 9 is a vertical sectional view of an internal pin-type chucking device slightly modified for actuation of the chuck pins from above instead of from below as in the FIGS. 6 and 7 form of the chuck.

As illustrated particularly in FIG. 9, the internal pin-type chucking device 50 is modified slightly for driving the core head 54 axially downwardly into engagement with the chuck pin heads 92 from above instead of drawing the core head body 106 downwardly from below by the post 58 and the actuating cylinder or device 116. In this slight modification, the upper hold-down plate 162 supports a pressure pad 250 rotatably mounted upon and secured to the hold-down plate 162 by the fastener 252 upon the bearing 254 which allows the pad to rotate about the shaft 256 of the hold-down screw 252. Thus, when the hold-down ball devices 150 are brought into bearing contact upon the crown 46 of the torus shell blank 38, the pressure pad 250 simultaneously bears downwardly upon the body 106 of the core head 54 to engage the heads 92 of the chuck pins 70 and drive them outwardly in their bores 68 into engaging contact at the pin points 104 with the inner side wall 42 of the sheet metal blank 38. Rotation of the blank is effected as before by the driving gear mechanism 77 and 76 through the body 60 of the chuck head 52.

E. EXTERNAL PIN-TYPE CHUCKING DEVICE

Figure 10:
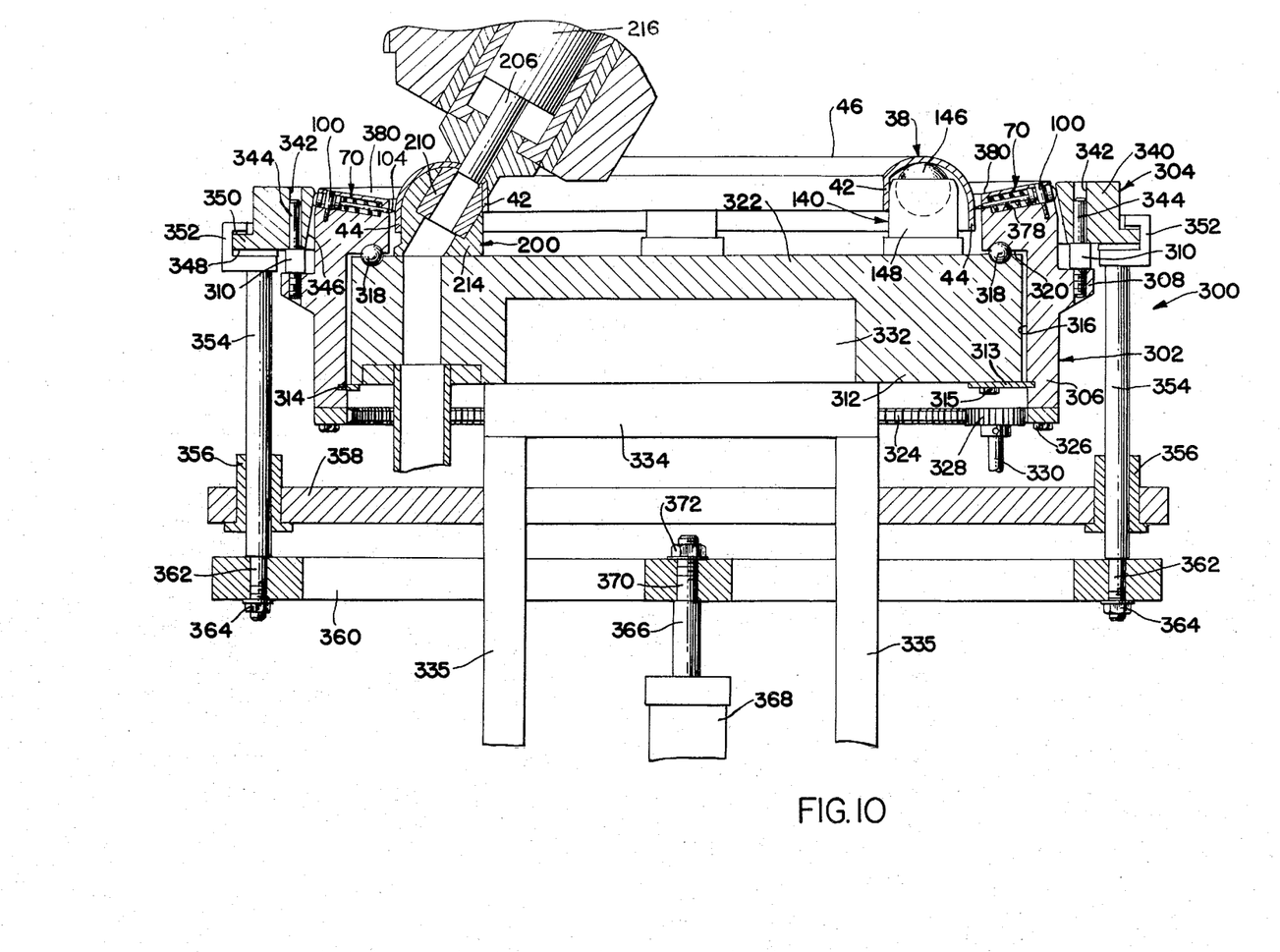
FIG. 10 is a vertical sectional view of an external pin-type chucking device arranged for engagement with a sheet metal part about its outer peripheral surface, the chuck pins being actuated by a pressure ring operated from below the chuck.
Figure 11:
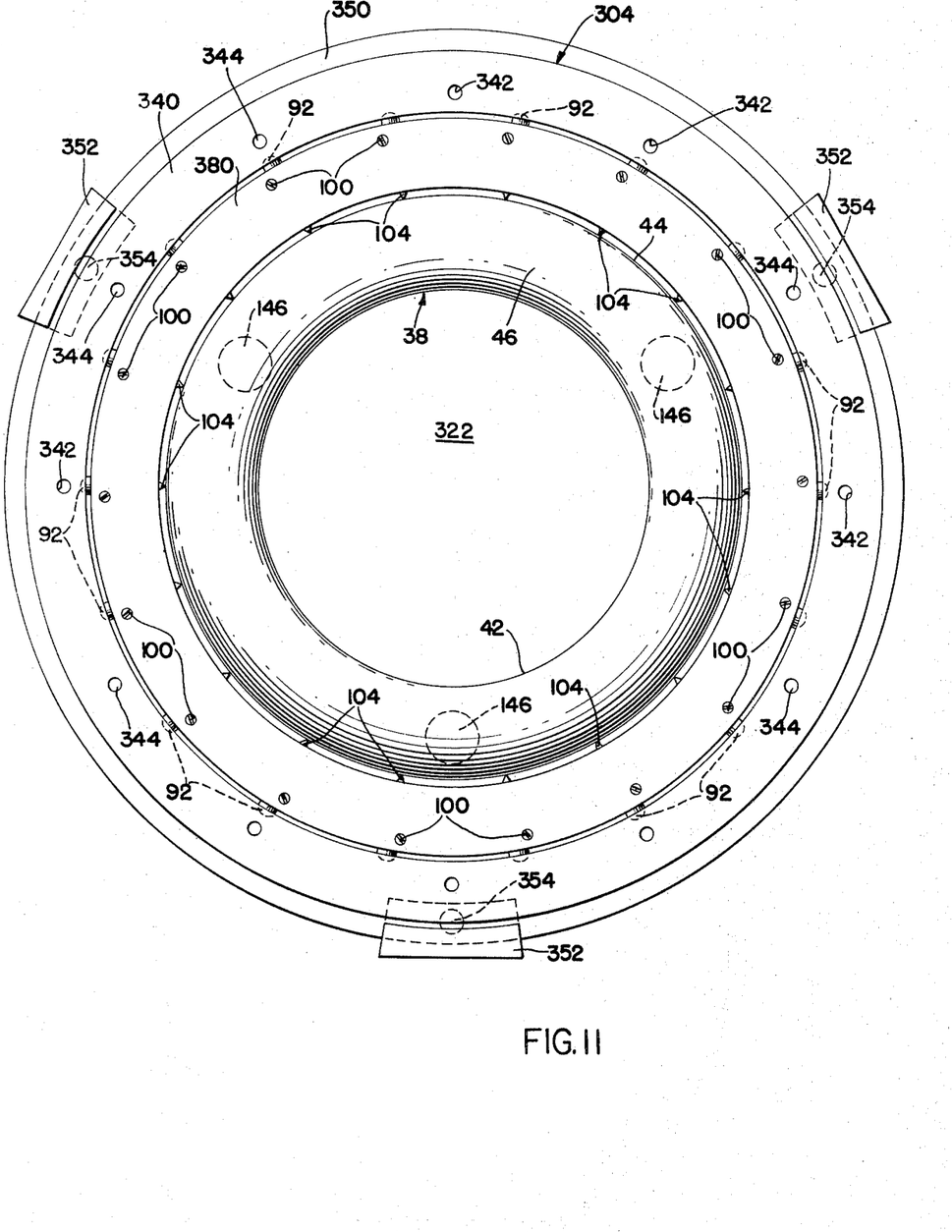
FIG. 11 is a plan view of the device illustrated in FIG. 10.

The invention is also embodied in an external chucking device in which chuck pins are operatively actuated to partially penetrate the outer side wall of a sheet metal part such for example as the torus shell blank 38. Two forms of an external chuck are disclosed and illustrated herein, more particularly in FIGS. 10, 11 and 12. The first of these is the draw-down chucking device 300 (FIGS. 10 and 11). In the FIG. 12 modification, the chucking device 300a embodies a pressure ring moving the core head downwardly from above by the upper hold-down plate, similar to the modification embodied in the internal chucking device described above and illustrated in FIG. 9.

The external chucking device 300 comprises the chuck head 302 and the annular pin-driving core head 304.

The chuck head 302 comprises a body 306 having a radially outwardly directed annular flange 308 supporting a plurality of core head guide pins 310 threadedly secured in the flange, a supporting holder 312 secured to the body 306 by an annular ring 313 disposed in the groove 314 and affixed to the holder by suitable fasteners 315, a plurality of bearings 318 rotatable in bearing raceways or in raceways formed in the counterbore seat 320 of the chuck head body 306 and in the adjacent surface 322 of the holder 312, and a driven gear ring 324 secured to the lower edge of the chuck body 306 by fasteners 326 for operative engagement with the driving gear 328 mounted upon its shaft 330 and driven by suitable power drive means not shown to rotate the chuck head 302 upon a supporting hub 332 axially mounted upon a post or support plate 334 suitably secured by members 335 in the machine in which the chucking device 300 is operatively controlled.

The external core head 334 comprises an annular ring having a body 340 provided with a plurality of guide pin bores 342 in which the guide pin shanks 344 of the guide pins 310 are slidingly fitted, a chuck pin actuating face or surface 346 being the annular inner wall surface of the core head body 340, a base 348 adapted to seat upon and abut the upper shoulders of the guide pins 310, and an outer annular flange 350 engageable by the grips or clamps 352 secured to the distal ends of the draw pins 354 slidingly mounted in bearings 356 disposed in the guide plate 358 and secured at their proximal ends to the draw plate 360 by the threaded shanks 362 and threaded fasteners 364. The draw plate is reciprocatingly actuated by the piston or drive rod 366 extending from the actuating mechanism or cylinder 368, which may be mechanically, hydraulically, pneumatically or electrically energized, and secured to the draw plate 360 by the rod shank 370 and the threaded fastener 372.

The chuck pins 70, which are substantially identical to those used in the internal chucking device 50, are slidingly disposed in bores 378 in the chuck body 306 adjacent the upper distal surface 380, the travel limiting pins 100 being disposed closely adjacent the pins 70 in the area of their undercut head section 96, as in the internal chucking device 50. Although shown radially inwardly inclined at a slight angle to the horizontal, the pins 70 can also be disposed in a horizontal attitude, i.e., in a plane substantially normal to the axis of the chucking device, or in any other desirable or required posture for the particular holding application in which the chucking device is used.

The slotting mechanism and the sheet metal part ball support mounts 140 are those described above in association with the internal chucking device and illustrated more particularly in FIGS. 6 and 8.

The chuck pin actuating core head 304 is reciprocatingly moved by the drive mechanism 368 through the drive rod 366 and plate 360, the draw bars 354 and draw clamps 352 secured about and overlying portions of the outer annular core head flange 350. As the core head reciprocatingly moves vertically upon the guide pin shanks 344 relative to the crown surfaces of the pin heads 92, when the core head 304 is spaced substantially away from the chuck head body 306 and the pin actuating surface 346 is out of contact with the pin heads 92 and the pin points 104 are retracted inwardly in their bores 378 by the pin biasing springs 90 to hold the pin points out of contact and out of the passage between the chuck head body 306 and the ball support mounts 140 in which the shell blank outer wall 44 will move for positioning upon the slotting die anvil body 214 and the balls 146 of the supports 140. When the sheet metal shell blank 38 has been positioned upon these support components, the core head body 340 and its surface 346 are drawn vertically downard by the actuating mechanism 368 into bearing contact upon the chuck pin heads 92 to force the pin points 104 into the outer surface of the shell blank outer wall 44 to engage the same for rotation upon the support balls 146 and the slotting die anvil body 214 and its die bushing 210.

F. MODIFIED EXTERNAL PIN-TYPE CHUCKING DEVICE

A slightly modified form of the external chucking device 300 embodies the overhead pressure pad features comparable to those described above and illustrated in FIG. 9 for the internal chucking device. As more particularly illustrated in FIG. 12, the core head 304a, reciprocatingly and slidingly mounted upon the guide pin shanks 390 threadedly secured in the chuck head flange 308a and having a travel limiting stop head 392 against the biasing force of the springs 394 disposed under the core head body 340a and upon the flange 308a, is operatively actuated by the pressure ring or pad 396 adapted to bear upon the upper surface 398 of the core head body 340a and provided with a counterbore 400 in which is seated the annular bearing 402 permitting the pressure ring 396 to rotate with the core head 304a. The pressure ring 396 is supported upon a clamp ring 404 fastened to the lower side of the upper hold-down plate 162 by suitable screws or fasteners 406.

Figure 12:
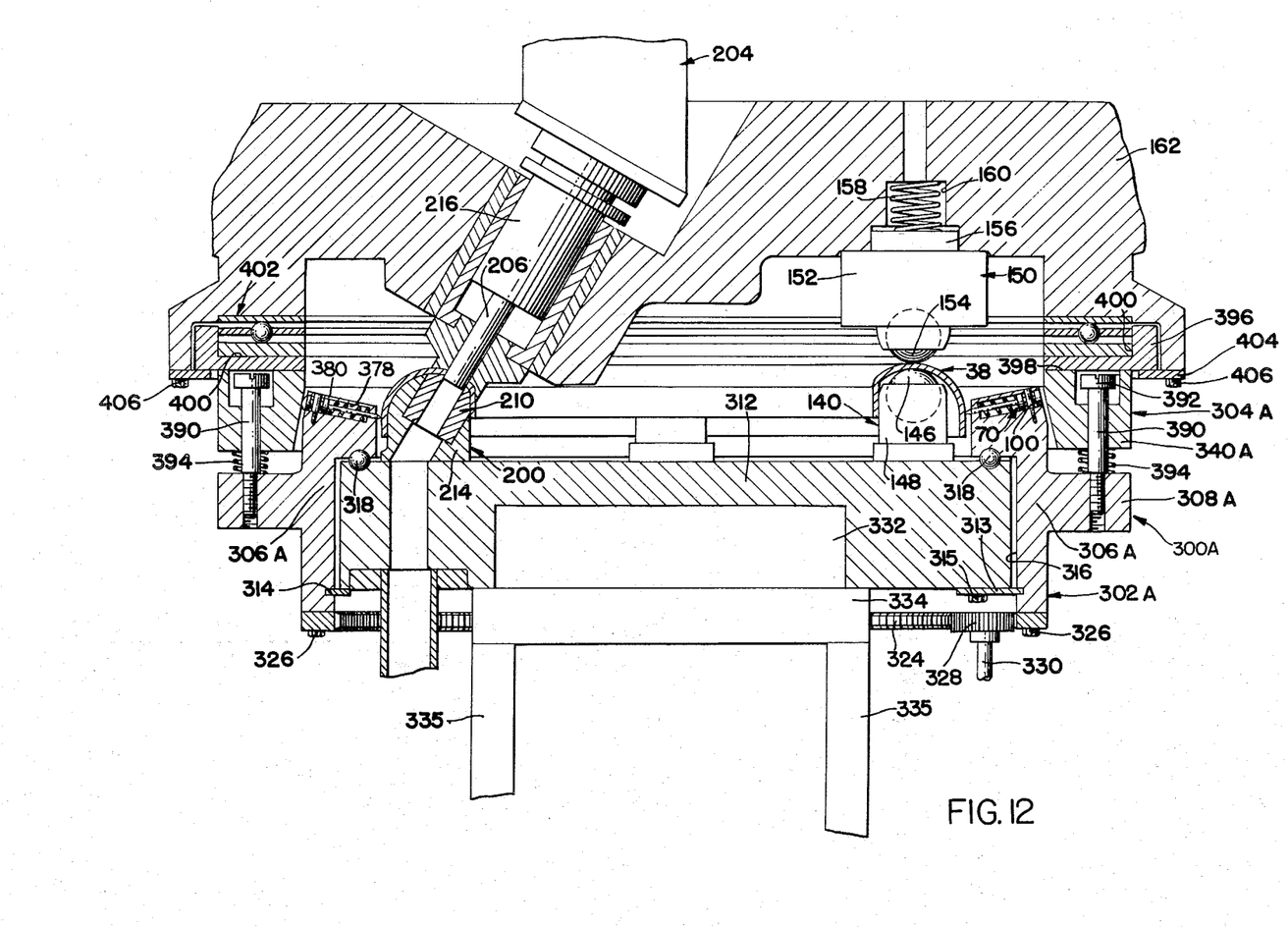
FIG. 12 is a vertical sectional view of another form of the external pin-type chucking device arranged for actuation of the chuck pins by a device from above the chuck.

Thus, when the upper hold-down plate 162 is retracted upwardly above and apart from the ball support mounts 140 and the slotting anvil 200, the biasing force of the springs 394 carries the core head 304a upwardly toward and into engagement with the guide pin heads 392 and simultaneously away from and out of contact with the chuck pin heads 92 slidingly positioned in their pin bores 378 in chuck head 302a, allowing the pin points 104 to retract away from the shell blank 38. When the hold-down balls 154 of the upper hold-down plate 162 are again brought downwardly into pressure bearing contact upon the crown portion 46 of the shell blank 38, pressure is simultaneously applied by the pressure ring or pad 396 upon the core head surface 398 of the core head body 340a to force the chuck pins 70 radially inwardly so that their pin points 104 partially penetrate the outer side wall 44 of the shell blank 38 to engage the same for rotation upon the ball support mounts 140 and the slotting anvil 200.

It will be noted from the disclosure of the invention presented hereinabove that sheet metal parts can be engaged by pin chuck devices which engage these parts, either internally or externally, by pointed chuck pins to rotatably drive them about an axis for a machining operation or operations. A plurality of chuck pins are used in a number sufficient to positively engage and rotatably drive the sheet metal part upon suitable supports, of which the ball mounts 140 and the slotting mechanism anvils 200 are merely representative forms, without distorting the sheet metal body. An important added benefit of this invention is the substantially reduced cost of producing the sheet metal blank secured by the pin-chucking device, because the heretofore required inner and outer flanges (see FIGS. 1–3) are no longer necessary and thus the extra material and the costly operation for removing it have been eliminated in the production process to a finished machined sheet metal part.

Such simplification of manufacturing practice and processing, while achieving reduced costs, also results in a substantially improved product, another achievement of the instant invention. Fringe benefits in the use of the pin chuck devices of this invention include, among others, the elimination of "play" or tolerance necessarily present in the location drive holes 16,16 of the prior art flanged sheet metal blank 10 and in the hold-down flanges required to secure the the blank at the outer flange 18, the elimination of locating the sheet metal blank upon the drive pins that locate the blank at the inner flange holes 16,16 because the blank 38 can be placed upon the ball support mounts 140 and the slotting anvil 200 in any position — there is no need to find a specific location, and the elimination of the "shimmy trim" operation to produce the blank 10, an operation that materially adds to the cost of the finished part.

Although particular embodiments of the invention have been disclosed herein for purposes of explanation, further modifications or variations thereof, after study of this specification, will or may become apparent to those skilled in the art to which the invention pertains. Reference should be had to the appended claims in determining the scope of the invention.

I claim:

1. In a machine operated pin-type chucking device for engaging and rotatably driving a sheet metal part for high speed automatic machine processing operations upon said part, the improved combination comprising a chuck head having a body mounted for rotation about its axis,
    said body having a substantial plurality of chuck pins more than three reciprocatingly slidingly disposed in bores radially of said axis,
    said chuck pins having heads at their proximal ends normally extending beyond a first surface of said chuck head body and sheet metal penetrating points at their distal ends normally disposed inwardly of and closely adjacent a second surface of said chuck head body adapted to be positioned adjacent a surface of said sheet metal part,
    said substantial plurality of chuck pins being relatively closely spaced radially of said chuck head to prevent distortion of said sheet metal part when said chuck pin points penetrate into the exterior surface of said sheet metal part for positioning the same for machine operation,
    the overall length of said chuck pins being somewhat greater than the length of said bores in which the pins are slidingly disposed,
    the overall length of each said chuck pins being substantially identical for substantially uniform simultaneous radial movement of said pin points beyond said second surface and penetration into said sheet metal part exterior surface, means in said pin bores normally biasing said chuck pins into retracted posture, means in said pin bores limiting the reciprocating travel of said chuck pins, and a core head reciprocatingly axially mounted for engagement with and upon said chuck pin heads to drive said pin points simultaneously forward in their bores and beyond said second surface for penetration of and engagement with said sheet metal part.

2. The improved chucking device defined in claim 1, wherein said chuck head has a body and a portion thereof disposed substantially radially inwardly of at least a portion of said sheet metal part.

3. The improved chucking device defined in claim 2, wherein said core head is disposed substantially radially inwardly of at least a portion of said chuck head body.

4. The improved chucking device defined in claim 3, wherein said chuck head body is provided with a counterbore, at least a portion of said chuck pin heads being normally biased outwardly of the surface of said counterbore, said core head being reciprocatingly movable into said counterbore and into driving engagement with and upon said pin head portions exposed therein.

5. The improved chucking device defined in claim 4, wherein the axes of said chuck pin bores are disposed at an angle to a plane normal to the axis of said chuck head body.

6. The improved chucking device defined in claim 3, wherein said chuck head body is provided at one axial end with a first counterbore adapted to receive said core head therewithin and with a second counterbore at its other axial end adapted to receive rotatable support means for said chuck head, and with a web section intermediate said counterbores for securement to said rotatable support means.

7. The improved chucking device defined in claim 6, wherein a thrust pad is secured to said web section in said first counterbore to limit the axial travel of said core head therein.

8. The improved chucking device defined in claim 6, and means bearing on said web section and against said core head to normally bias said core head away from and out of contact with said chuck pin heads.

9. The improved chucking device defined in claim 1, wherein said biasing means comprises a coiled substantially cylindrical spring disposed substantially concentrically about the pointed shank of said chuck pin and within a counterbored portion of said pin bore.

10. The improved chucking device defined in claim 1, wherein said travel limiting means comprises a pin threadedly secured in said chuck head body intermediate said chuck pin head and a flange spaced apart longitudinally of said head and closely adjacent a body portion of said chuck pin.

11. The improved chucking device defined in claim 3, wherein said core head comprises a body having a peripheral surface adapted to engage and bear upon said chuck pin heads when said core head is moved axially toward said chuck head body and to separate from said chuck pin heads when said core head is moved axially away from said chuck head body.

12. The improved chucking device defined in claim 11, wherein said core head body is substantially in the form of a conical frustum.

13. The improved chucking device defined in claim 11, wherein said core head body is provided with means guiding said core head in its reciprocating axial movement relative to said chuck pin heads.

14. The improved chucking device defined in claim 13, wherein said guide means comprises a plurality of bores and communicating counterbores in said core head body and a like plurality of guide pins threadedly secured in said chuck head body.

15. The improved chucking device defined in claim 14, wherein said guide pins are provided with heads at their distal ends slidably disposed in said core head body counterbores to limit the axial travel of said core head away from said chuck head body.

16. The improved chucking device defined in claim 11, wherein the axis of said chuck head and the axis of said core head are coincident.

17. The improved chucking device defined in claim 16, wherein means for moving said core head axially comprises a draw bar secured to said core head and extending substantially axially therefrom, and power means conjoined to said draw bar to reciprocatingly move the same.

18. The improved chucking device defined in claim 16, wherein means for moving said core head axially comprises a pressure pad mounted rotatably upon an upper sheet metal part hold-down plate disposed substantially axially above and apart from said core head, said upper plate being reciprocatingly axially movable toward and away from said core head to bring said pressure pad into and out of pressure bearing contact with and upon said core head body.

19. The improved chucking device defined in claim 1, wherein said chuck head has a body substantially in the form of an annular ring adapted to be disposed substantially radially outwardly of at least a portion of said sheet metal part.

20. The improved chucking device defined in claim 1, wherein said core head is substantially in the form of an annular ring disposed substantially radially outwardly of at least a portion of said chuck head body.

21. The improved chucking device defined in claim 20, wherein
said chuck head body is provided with a bore,
at least a portion of said chuck pin heads being normally biased outwardly of the peripheral surface of said chuck head body,
said core head being reciprocatingly movable into driving engagement with and upon said pin head portions exposed therein.

22. The improved chucking device defined in claim 21, wherein
the axes of said chuck pin bores are disposed at an angle to a plane normal to the axis of said chuck head body.

23. The improved chucking device defined in claim 20, wherein
said chuck head body is provided at one axial end with a bore adapted to lie closely adjacent at least a portion of said sheet metal part,
said chuck pins being disposed in said chuck head body adjacent said one axial end,
said chuck head body being provided at its other axial end with a counterbore adapted to receive therewithin and spaced therefrom holder means to support said chuck head body for rotation,
and with driven means secured to the proximal end of said chuck head body whereby said chuck head body is rotatably driven.

24. The improved chucking device defined in claim 23, wherein
said driven means comprises an internal ring gear.

25. The improved chucking device defined in claim 23, wherein
said chuck head body is provided with an annular outer flange,
said core head body being provided with means guiding said core head in its reciprocating axial movement secured to said chuck head body annular outer flange.

26. The improved chucking device defined in claim 20, wherein
said core head comprises a body having an inner bore surface adapted to engage and bear upon said chuck pin heads when said core head is moved axially toward said chuck head body and to separate from said chuck pin heads when said core head is moved axially away from said chuck head body.

27. The improved chucking device defined in claim 26, wherein
said core head body inner bore surface is inclined downwardly inwardly.

28. The improved chucking device defined in claim 26, wherein
said core head is provided with an annular outer flange.

29. The improved chucking device defined in claim 25, wherein
said guide means comprises a plurality of bores disposed radially axially through said core head body and a like plurality of guide pins slidingly disposed in said latter bores and fixedly secured in said chuck head body annular outer flange.

30. The improved chucking device defined in claim 29, wherein
said guide pins are provided with shoulders spaced from their distal ends to limit the axial travel of said core head toward and about said chuck head body.

31. The improved chucking device defined in claim 25, wherein
said chuck head body annular outer flange is disposed axially below said chuck pins and their bores in said chuck head body.

32. The improved chucking device defined in claim 20, wherein
the axis of said chuck head and the axis of said core head are coincident.

33. The improved chucking device defined in claim 23, wherein
said holder support means is provided with bearings intermediate and in supporting relationship to and for rotation of said chuck head body.

34. The improved chucking device defined in claim 28, wherein
means for moving said core head axially comprises
a plurality of draw bars having clamps affixed to their distal ends,
said clamps engaging said core head annular outer flange and extending substantially axially therefrom,
and power means conjoined to said draw bars to reciprocatingly move said draw bars axially.

35. The improved chucking device defined in claim 24, wherein
means for rotatively moving said chuck head body comprises
power gear drive means cooperatively associated with said internal ring gear.

36. The improved chucking device defined in claim 25, wherein
said guide means comprises a plurality of bores and communicating counterbores in said core head body and a like plurality of guide pins fixedly secured in said chuck head body annular outer flange,
said guide pins being provided with heads at their distal ends slidably disposed in said core head body counter-bores to limit the axial travel of said core head away from said chuck head body,
and means disposed intermediate said core head and said chuck head body annular outer flange normally biasing said core head away from and out of contact with said chuck pin heads.

37. The improved chucking device defined in claim 36, wherein
means for moving said core head axially comprises
a pressure pad in the form of an annular ring rotatably mounted upon an upper sheet metal part hold-down plate disposed substantially axially above and apart from said core head,
said upper plate being reciprocatingly axially movable toward and away from said core head to bring said pressure pad into and out of pressure bearing contact with and upon said core head to move the latter axially into and out of engagement with and upon said chuck pin heads.

* * * * *